June 28, 1932. C. E. JONES 1,864,653
POWER OPERATED VALVE OPENING AND CLOSING APPARATUS
Filed Nov. 20, 1930 8 Sheets-Sheet 1

FIG. 1.

Inventor:
Charles Edward Jones,
By Spear Donaldson & Hall
Attys.

Inventor:
Charles Edward Jones,
By Spear Donaldson & Hall
Attys.

June 28, 1932. C. E. JONES 1,864,653
POWER OPERATED VALVE OPENING AND CLOSING APPARATUS
Filed Nov. 20, 1930 8 Sheets-Sheet 3

Inventor:
Charles Edward Jones,
By Spear, Donaldson & Hall
Attys.

June 28, 1932.  C. E. JONES  1,864,653
POWER OPERATED VALVE OPENING AND CLOSING APPARATUS
Filed Nov. 20, 1930   8 Sheets-Sheet 7

Inventor:
Charles Edward Jones,
By Spear, Donaldson & Hall
Attys.

Inventor:
Charles Edward Jones,

Patented June 28, 1932

1,864,653

UNITED STATES PATENT OFFICE

CHARLES EDWARD JONES, OF BRADFORD, ENGLAND

POWER OPERATED VALVE OPENING AND CLOSING APPARATUS

Application filed November 20, 1930, Serial No. 496,979, and in Great Britain November 26, 1929.

This invention relates to electric motor operating means and control apparatus for main and by-pass valves, and the object is to improve the construction of this type of gear so as to ensure certainty of action, the desired sequence of operation and the interlock where multiple controllers are employed to operate a main valve and its by-pass.

The invention is illustrated in the accompanying drawings, in which:—

Fig. 2B, Fig. 4, Fig. 5, Fig. 6, and Fig. 7 refer to the same modification, Fig. 5 showing direct current and Fig. 6 alternating current motors.

Throughout the drawings the main parts of the mechanical gear are designated by the following letters of reference.

V is the main valve, $v1$ main valve operating screw, $v2$ the valve guide, $v3$ side rods supporting the valve crosshead. A′ the valve box in which are located the main valve limit switches; O the trip to open the open limit switches when the main valve is full open. C the trip to open the close limit switches when the main valve is closed; B is the limit switch trip bar actuated by the engaging part D carried by the guide $v2$.

G is the by-pass valve, $g1$ the operating screw of the by-pass valve, and $g2$ an extension thereof, F the valve box in which are located the limit switches actuated by the by-pass valve.

M is the main motor, $m1$ the motor spindle; $m2$, $m3$, $m4$, $m5$, $m6$, $m7$ and $m8$ the centrifugal clutch and gearing, by which the motor is connected to the element $m9$ of the main clutch freely mounted on the spindle $v1$; $s12$ the element of this clutch feathered on the valve spindle $v1$; and $h1$ the third element attached to the hand wheel H.

S is the main control which controls the main clutch part $s12$ and the centrifugal clutch $m2$—$m4$, through the lever $s5$ pivoted at $s6$ and connected at one end $s8$ to the control parts of the clutches $m2$—$m4$, and $m9$ and connected at the other end, $s4$, to the movable part $s1$ of the solenoid S, said movable part being controlled by a spring $s2$ which normally moves the lever $s5$ into the position in which the hand gear is in engagement.

The extension rod $g2$ of the by-pass valve is connected by the parts $g3$ and $g4$ to the tappet mechanism in the box F by which the by-pass limit switches and sequence switch to be described, are actuated.

The terminals of the several electrical parts are indicated by the italic letter corresponding with the letter designating the respective part.

The above enumerated parts mainly constructed and adapted to operate as described in my said prior specification, may conveniently be employed in carrying out my present invention, but any other suitable gearing may be employed by which solenoids are arranged to control a main operating clutch and clutches interposed between the motor and the main and by-pass valves.

In carrying out the present invention the limit switches are arranged as follows:—

$o1$ and $o2$ are a connected pair of main valve "open" limit switches.

$c1$ and $c2$ are a connected pair of main valve "close" limit switches.

These switches are located within the valve box A' and are shown diagrammatically, and are operated by tappet gears O and C.

$Go1$ and $Gc1$ are the single, (and $Go1$ and $Go2$, and $Gc1$ and $Gc2$, the corresponding pairs of) by-pass valve (G) "open" and "close" limit switches located in the valve box F and operated by tappet gear on the spindle $g2$ of the by-pass valve, and $Gs$ is the sequence control switch.

K is the main controller which would be double pole, but which is shown diagrammatically for single pole switch connections; for three-phase currents the controllers employed would be triple-pole, or double-pole with one pole in each of two of the phases. The controller in practice would be of the multiple contact drum type.

E is the auxiliary solenoid, and Z is the auxiliary motor.

Figure 1:
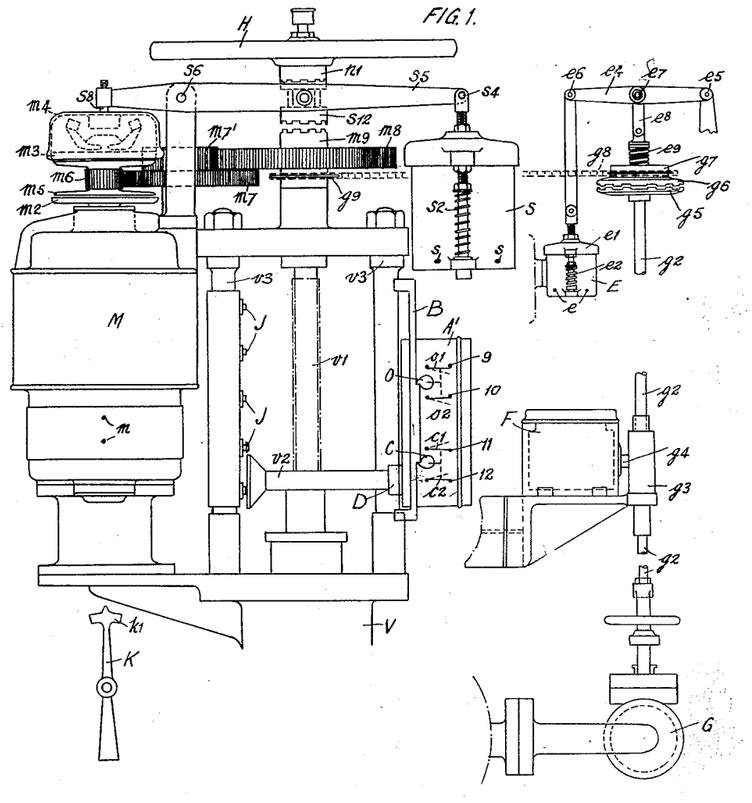
Fig. 1 is an elevation showing the general arrangement when the invention is applied to a main steam stop valve fitted with a by-pass valve both operated by the one motor.

Referring first to Fig. 1;—

In this modification the extension $g2$ of the spindle of the by-pass valve G operates the limit switches and the sequence control switch in the box F, through the gear $g3$ and $g4$; and has fitted to it a clutch comprising two elements $g5$ and $g6$, one of which is non-rotationally attached to the spindle $g2$, the other being free to rotate relatively to the spindle $g2$, and being connected by the chain wheel $g7$, and chain $g8$ to a chain wheel $g9$ fixed to the clutch part $m9$ and wheel $m8$ driven, as described, by the motor M.

The clutch $g5$, $g6$ is controlled by a lever $e4$ pivotally fixed at the end $e5$, and connected at the end $e6$ to the moving part $e1$ of the solenoid E; $e2$ is the spring and $e$ the terminal connections of the auxiliary solenoid. The lever $e4$ is connected to the movable part of the clutch $g5$, $g6$ by a link $e8$; $e9$ is a spring which when the solenoid is de-energized holds the two parts of the clutch $g5$, $g6$ disengaged; the parts are in opposition to the spring held in frictional engagement when the auxiliary solenoid E is energized so that when the motor M is started up it drives the spindle $g2$ through the gearing $g9$, $g8$, $g7$ and the clutch members $g6$, $g5$, opening or closing the by-pass valve G according to the direction of rotation of the motor.

Figure 1A:
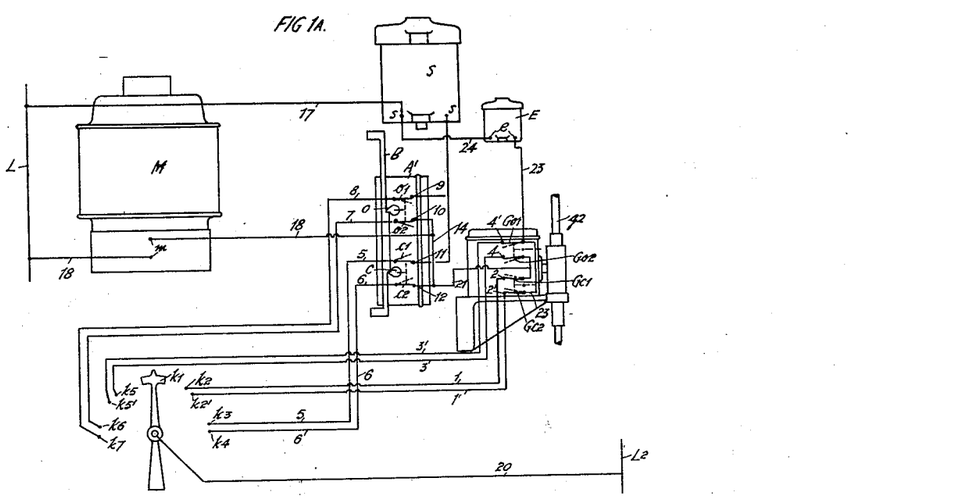
Fig. 1A, Fig. 1B and Fig. 1C show the main parts of Fig. 1, to which are added a diagram of the connections for respective modifications of the electric control gear, the switches being illustrated diagrammatically in proximity to the gear by which they are operated.

The arrangement of the electrical connections by which the apparatus described is controlled is shown in Fig 1A; in this arrangement the "open" limit switches $o1$ and $o2$, and the "close" limit switches $c1$ and $c2$ of the main valve are each normally held closed by springs, but the switches $o1$ and $o2$ are open when the main valve is full open, and the switches $c1$ and $c2$ are open when the main valve is fully closed; these pairs of switches are respectively operated by the tripping pieces O and C which in turn are actuated by the trip bar B, actuated by the engaging part D fixed to the guide $v2$ of the main valve. $Go1$ and $Go2$ are the "open" limit switches, and $Gc1$ and $Gc2$ are the "close" limit switches of the by-pass valve G; these switches $Go1$, $Go2$ open when the by-pass valve is fully open, and the switches $Gc1$, $Gc2$ open when the by-pass valve is closed.

The controller is shown diagrammatically as suitable for a D. C. operation. For simplicity sake, the motor shunt circuit (the terminals of which are $m$) only is shown; the motor armature circuit switches operated by the controller are omitted, but it is to be understood that when the controller is moved from mid-position clock-wise into any of the closing positions, contacts are made (not shown in this diagram but shown in Fig. 5) which give the armature connections necessary to ensure rotation of the motor in the direction which gives closing movement to the valves, and that when the controller is moved from mid-position counter-clockwise to any of the opening positions, the armature current is reversed to give the reversal of rotation of the motor.

L and L2 are the two supply mains.

K is the contact arm, shown in each case in its "off" or mid-position; $k1$ is a contact segment carried by the arm, $m2$, $m2'$ are the by-pass closing contacts, $k3$ and $k4$ are main valve closing contacts $k5$, $k5'$ are by-pass opening contacts, and $k6$ and $k7$ are main valve opening contacts. The connections are as follows:—

$k1$ is connected by the lead 20 to the supply main L2.

$k2$ is connected by the lead 1 to the contact 2 of the "close" limit switch $Gc1$; $k2'$ is connected by the lead 1' to the contact 2' of the "close" limit switch $Gc2$; $k5$ is connected by the lead 3 to the contact 4 of the "open" limit switch $Go1$. $k5'$ is connected by the lead 3' to the "open" limit switch $Go2$; $k3$ is connected by the lead 5 to the "close" limit switch $c1$, $k4$ is connected by the lead 6 to the "close" limit switch $c2$; $k6$ is connected by the lead 7 to the "open" limit switch $o2$, and $k7$ is connected by the lead 8 to the "open" limit switch $o1$; the contacts 9 and 11 of the limit switches $o1$ and $o2$ are connected by the lead 21 to the terminal $s$ of the main solenoid S and to the contact 10 of the "open" limit switch $o2$; and the contacts 10 and 12 of the "close" limit switch $c2$ are connected, by the leads 14 and 18, to one of the motor terminals $m$, and by the leads 14 and 21 to the two by-pass limit switches $Go2$ and $Gc1$; the by-pass limit switches $Go2$ and $Gc2$ are connected by the lead 23 to the terminal $e$ of the auxiliary solenoid. The terminals $s$ and $m$ of the main solenoid and motor M are connected by the leads 17 and 18 respectively to the main L, and the terminal $e$ of the auxiliary solenoid E is connected to the main L by the leads 24 and 17.

Assuming both valves to be closed and the controller K be moved counter-clockwise so that the segment $k1$ makes contact with $k5$ and $k5'$ which is the by-pass open position; the circuit will be completed from main L2, lead 20, contact $k5$, lead 3, switch $Go2$, leads 21 and 14, lead 18, motor terminal $m$ and lead 18 to main L; and from $L^2$, lead 20, contact $k5'$, lead $3'$, switch $Go1$, lead 23, auxiliary solenoid E, leads 24 and 17 to main L.

Under these circumstances the motor will be started up in the correct direction to open the by-pass valve, and as the auxiliary solenoid E is energized, the clutch members $g5$ and $g6$ (see Fig. 1) will be in engagement, and the by-pass valve will be operated to open through the gear $g9$, $g8$, $g7$, $g6$, $g5$, $g2$. When the by-pass valve is fully open the limit switches $Go1$ and $Go2$ open and the motor is stopped and the auxiliary clutch de-energized.

If the switch K be moved counter-clockwise to the main open position, the contacts $k6$ and $k7$ are connected by the segment $k1$ through lead 20 to the main $L^2$, the circuit from $k6$ is completed through lead 7, open limit switch $o2$, lead 18, motor M, lead 19, main L, and the motor is thus started up. The circuit from $k7$ is completed through leads 8, open limit switch $o1$, contact 9, lead 21, main solenoid S, and lead 17 to $L^2$; the actuation of the solenoid S engages the motor to the main clutch and the main valve is opened; when the main valve is fully open the circuits are disconnected by the opening of the switches $o1$ and $o2$.

Assuming both valves to be open, and the controller K be moved clock-wise to the by-pass valve close position, the circuit will be from the main $L^2$, lead 20, segment $k1$, contacts $k^2$, $k^{2'}$; then by lead 1, contact 2, switch $Gc1$, leads 21, 14 and 18, motor M, main L1, and by lead $1'$, contact $2'$, switch $Gc2$, lead 23, auxiliary solenoid E, leads 24 and 17 to main L1. The motor M rotates in the reverse direction and closes the by-pass valve through the action of the clutch $g5$ and $g6$ which is engaged by the energizing of the auxiliary solenoid. When the by-pass valve is closed the switches $Gc1$ and $Gc2$ open and break both circuits.

If the controller K be now removed further clock-wise to the main valve close position, contacts $k3$ and $k4$ are connected through the lead 20 to the supply main $L^2$, the circuits completed being from contact $k4$ through lead 6, close limit switch $c2$, leads 14 and 18, motor M and main L1. The circuit from $k3$ is completed through lead 5, close limit switch $c1$, lead 21, main solenoid S, lead 17, main L1. The main valve is thus by these connections closed, whereupon the "close" limit switches C1 and C2 are opened and the circuits broken.

It will be seen that according to the arrangement described the by-pass is not operated by the free movement of the motor before or after it has been connected to the main clutch gear by means of the main solenoid; in which latter arrangement any over-running of the motor due to its inertia after the appropriate limit switch has been opened has to be arrested, by the completion of the closing or opening movement of the valve, and this introduces undesirable stress and work on the valve seatings.

In the arrangement described the operation of the appropriate limit switch de-energizes the auxiliary solenoid, and this instantly disengages the clutches $g5$, $g6$ permitting any inertia movement of the motor to continue without damage to the valve. This definite control of the by-pass valve is also advantageous in many other ways for example, when the electrical gear is used to "inch" or slowly complete the travel of the main valve.

Figure 1B:
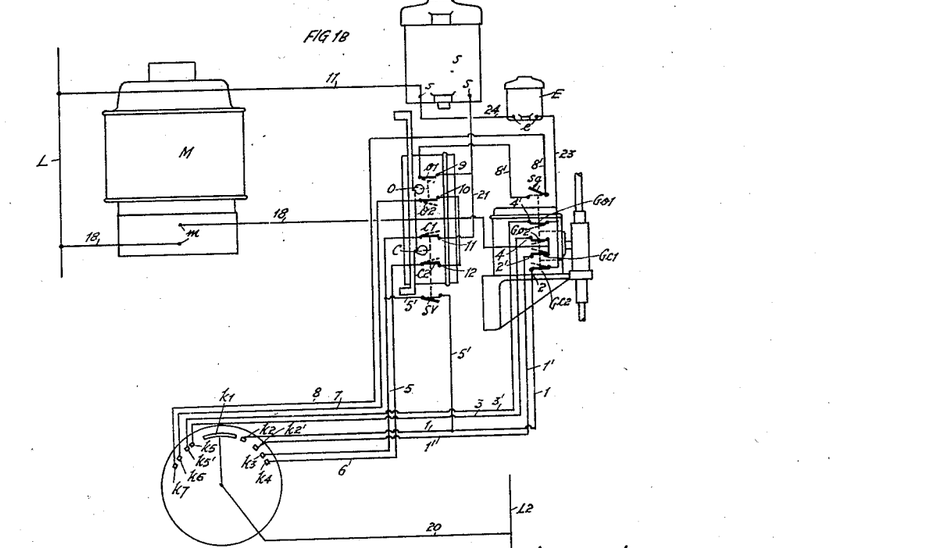

In the arrangement described the main and by-pass valve may be opened and closed independently, and in any desired order. Usually, however, it is desirable to provide automatic means, outside the control of the attendant, for a definite sequence of operation of the two valves. Such sequence usually is that in opening, the valve the by-pass valve shall open before the main valve, and that in closing, the by-pass valve should be closed after the main valve, an arrangement for ensuring this, and in which the auxiliary solenoid is employed as in the modification just described, is illustrated in Fig. 1B. In this arrangement the contacts $k3$ and $k4$ are connected by the leads 5 and 6 to the main close limit switches $c1$ and $c2$ respectively; and the contact $k6$ is connected by the lead 7 to the main open limit switch $c2$. These connections are as described in Fig. 1A, but the contact $k7$ instead of being connected directly to the main open limit switch $o1$ by the lead $8^2$ is connected to this limit switch through leads $8^1$ and the switch $Sg$, which will be termed a sequence switch, this switch is connected to the open limit switch $Go1$ of the by-pass valve in such manner that when the switch $Go1$ closes the sequence switch $Sg$ opens and vice-versa.

The contacts $k5$ and $k5'$ are connected by the leads 3 and $3'$ to the by-pass limit switches Go2 and Go1 and the contacts k2 and k2' are connected by the leads 1 and 1' to the by-pass close limit switches Gc2 and Gc1.

The contacts k3 in addition to being connected by the lead 5 to the main close limit switch c1 is also connected through a sequence switch Sv by the leads 5' and 1 to the by-pass valve close limit switch Gc2. The sequence switch Sv is connected to the main close limit switch c2 in such manner that when c2 is open Sv is closed and vice versa.

The contacts 10 and 12 of the switches o2 and c2 are connected by the lead 18 through the motor M to the supply main L, and the contacts 9 and 11 of the switches o1 and c1 are connected by the lead 21 through the main solenoid S and lead 17 to the main L; the switches Go1 and Go2 are connected by the mains 23, 24 and 17 through the auxiliary solenoid E to the supply main L; and the switches Go2 and Gc1 are connected by the leads 21 and 18 through the motor M to the supply main L. The contact k1 of the main controller K connected by the lead 20 to the supply main $L^2$. These connections being substantially as described in connection with Fig. 1A.

Assuming the main and by-pass valves to be closed and that it is desired to open the by-pass valve, the segment k1 of the main controller is moved to contact with the contacts k5 and k5', when the by-pass valve is open as described in Fig. 1A; if it be desired to open the main valve and the by-pass valve in proper sequence the segment k1 of the controller is made to contact with the contacts k5, k5', k6 and k7. The circuit of the motor M is thus completed through the switch Go2 and the circuit of the auxiliary solenoid E is closed through the switch Go1, the circuit of the motor M is also completed through the main open limit switch o2; the circuit of the main solenoid S however, is not at first completed since the sequence switch Sg will be open by reason of the switch Go1 being closed; the motor will therefore be operative through the clutch g5, g6 (see Fig. 1) coupled by the action of the auxiliary solenoid E, to open the by-pass valve, whereupon the switches Go1 and Go2 open de-energizing the auxiliary solenoid E and opening the circuit of the motor M which was completed through the switch Go2, but leaving the motor circuit completed through the switch o2.

Immediately the switch Sg closes the solenoid S is energized and couples the motor M to the main valve which is then opened, whereupon the open limit switches o1 and o2 open and disconnect the motor and main solenoid from the mains. The sequence switch Sg ensures the opening of the by-pass valve (should it not have been previously opened by passing the controller contact k1 over the contacts k5, k5') before the main valve is open.

Assuming both valves to be in the open position and it is desired to close the by-pass valve, k1 is moved to make contact with the contacts k2, k2' whereupon the by-pass valve closes as described in connection with Fig. 1A; should it be desired to close the main and by-pass valves in proper sequence, segment k1 is moved over the contacts k2', k3 and k4, but does not, in this position, contact with the contact k2; the motor circuit is now completed through the switch Gc1 and leads 21 and 18, and also through the switch c2 and leads 14 and 18, and the main solenoid is energized through the switch c1 and leads 21 and 17; the auxiliary solenoid E is not energized since the switch Sv is open. The main valve now closes whereupon the switches c1 and c2 open and the sequence switch Sv closes completing the auxiliary solenoid circuit from the contact k3, lead 5, switch Sv, leads $5^1$ and 1, switch Gc2, leads 23, 24 and 17, the circuit of the motor M being still maintained through the switch Gc1; solenoid E couples the clutch g5, g6 whereupon the motor M closes the by-pass valve, but as explained not until the main valve has been closed.

Figure 1C:
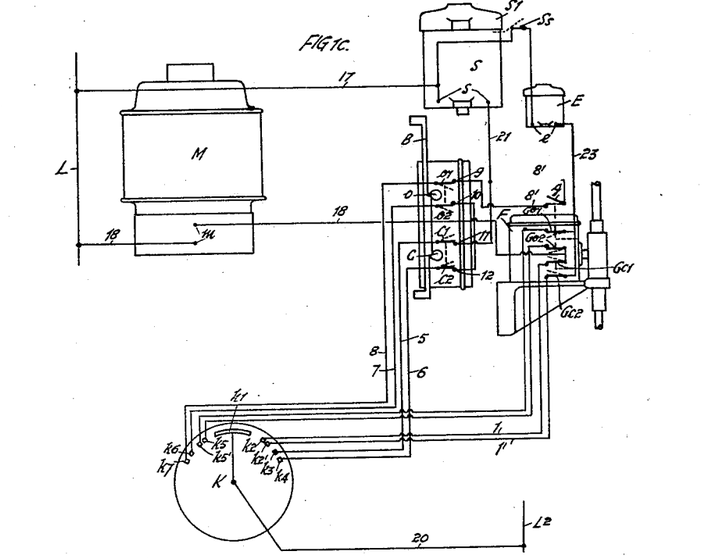

The sequence opening and closing last described may be obtained with the modification shown in Fig. 1C, in this case the sequence switch Sv is dispensed with and is replaced by a sequence switch Ss which is actuated by the moving part s1 on the main solenoid S, being opened when the solenoid is energized and closed by a spring when the solenoid is de-energized; the sequence switch Sg is as before connected by leads $8^1$ and 21 in series with the limit switch o1 and the main solenoid S.

The connections otherwise are the same as shown in Fig. 1B and the action in opening and closing the by-pass valve and in opening the main and by-pass valves in proper sequence is as described in Fig. 1B, and as the several parts and connections are similarly lettered there will be no difficulty in following this action in connection with Fig. 1C. In this modification the by-pass valve and main valve are closed in proper sequence as follows;—the segment k1 of the controller is moved to contact with the contacts k2', k3 and k4, when this is done the motor circuit is completed through the contact k4 and main close limit switch c2 and the contact k2 and by-pass close limit switch Gc1; the circuit of the solenoid S is closed through contact k3 and limit switch L'; the circuit of the auxiliary solenoid E would also be closed except that, as the solenoid S is energized the sequence switch Ss is open, under the circumstances the motor M closes the main valve whereupon the limit switches c1 and c2 open interrupting the circuit to the main motor through the main limit switch and breaking the circuit of the main solenoid S; the sequence switch Ss thereupon closes and energizes the auxiliary solenoid E, the motor circuit being still completed through the limit switch Gc1; the clutch g5, g6 now couples the by-pass valve spindle (see Fig. 1) to the motor M, which closes the by-pass valve whereupon the close limit switches Gc1, Gc2 open and disconnect the motor and the auxiliary solenoid from the circuit.

Figure 2:
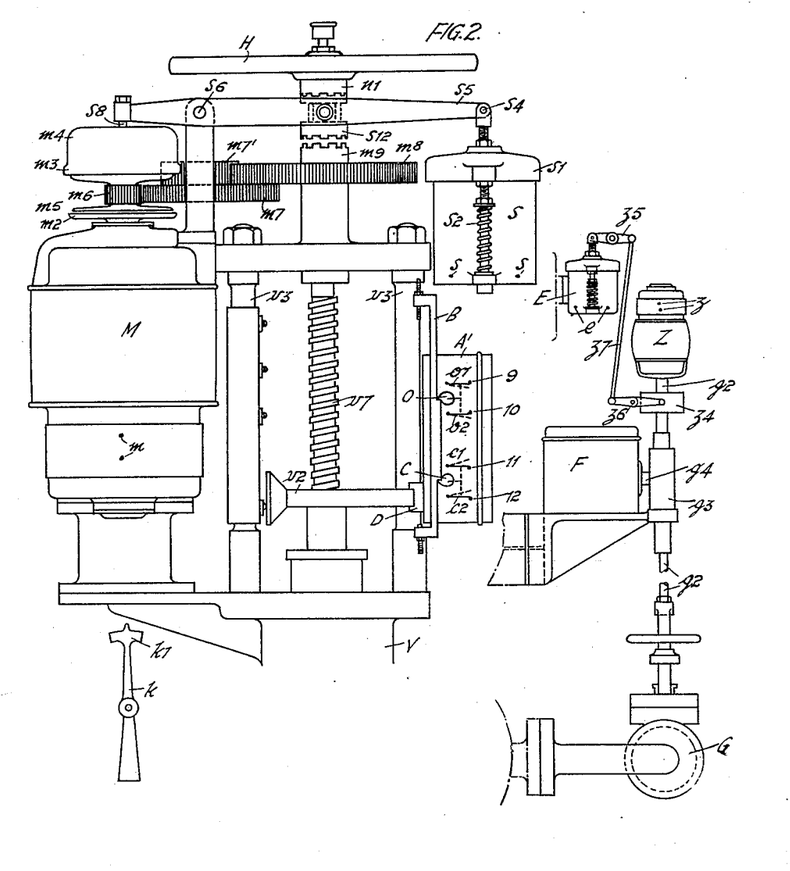
Fig. 2 is a view similar to Fig. 1, and shows the general arrangement when the by-pass valve is operated by an auxiliary motor.

Referring now to Fig. 2;—the construction is substantially similar to that illustrated in Fig. 1 as far as the action of the main motor M, its gearing to the main valve spindle, the solenoid S and its operation of the main clutch, and the main open and close limit switches.

In this modification however, the auxiliary solenoid E is employed to couple the independent motor Z which is employed to operate the by-pass valve, to the spindle of the said valve through the clutch $z4$ which may be similar in action to the clutch $m2$, $m3$, $m4$, $m5$ (see Fig. 1). The solenoid E actuates the clutch $z4$ by means of the levers $z5$ and $z6$ and the rod $z7$, after the manner in which the solenoid S actuates its clutches. A are the shunt terminals of the motor Z. The armature connections of the motor Z are made by contacts on the main controller K (not shown in the drawings) so that when the controller K is moved to a valve close position, the armature connections are such as to give the necessary direction of rotation to close the valve, and that when the controller is moved to the valve open position these armature connections are reversed.

Figure 2A:
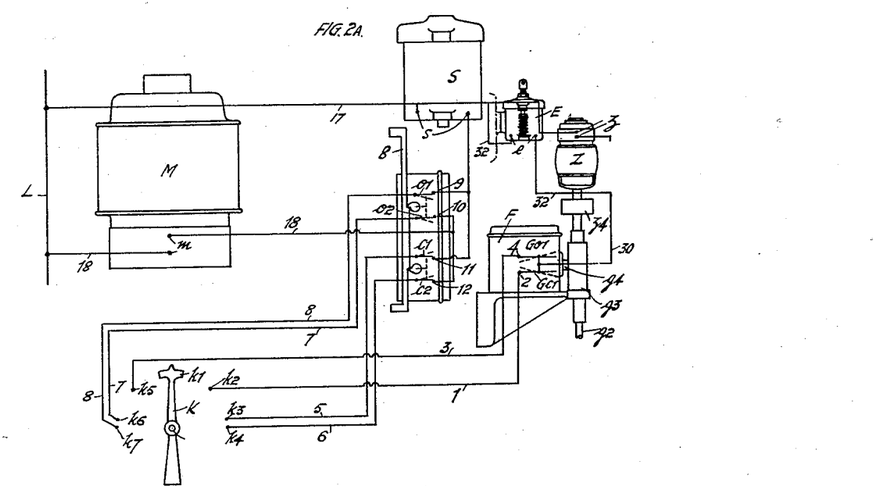
Figs. 2A, 2B and 2C show the electrical connections for Fig. 2 and are views similar to Fig. 1A, Fig. 1B and Fig. 1C.

The electrical connections for this modification are shown in Fig. 2A.

Contacts $k3$ and $k4$ are connected to the leads 5 and 6 through the main close limit switches $c1$ and $c2$ to the main solenoid circuit and to the motor circuit respectively; and the contacts $k5$ and $k6$ are connected by the leads 7 and 8 through the main open limit switches $o2$ and $o1$ through the motor and main solenoid respectively, the connections in this respect being the same as described in connection with Fig. 1A.

In this arrangement there are but two limit switches on the by-pass valve, the contact $k2$ being connected by the lead 1 to the close limit switch Gc1 and the contact $k5$ being connected by the lead 3 to the open limit switches Go1. Both limit switches are connected by the leads 30, 31, and 32 and the lead 17 to the supply mains L and through the motor Z and auxiliary solenoid E.

To open the by-pass valve the segment $k1$ of the controller K is made to contact with $k5$, this starts the motor and energizes the solenoid E whereupon the valve is opened; when the by-pass valve is opened the limit switch Go1 is opened, the solenoid E is de-energized, disconnecting the motor from the by-pass valve, and the circuit of the motor Z is broken.

To close the by-pass valve, $k1$ contacts with $k2$, the auxiliary solenoid E and the motor Z being energized but its direction reversed, and when the valve is closed both circuits are broken by the limit switch Gc1.

To open the main valve, $k1$ contacts with $k6$ and $k7$ and to close the main valve $k1$ is made to contact with $k3$ and $k4$, the action being similar to that described; the several connections being lettered to correspond with the modifications already described.

Figure 2B:
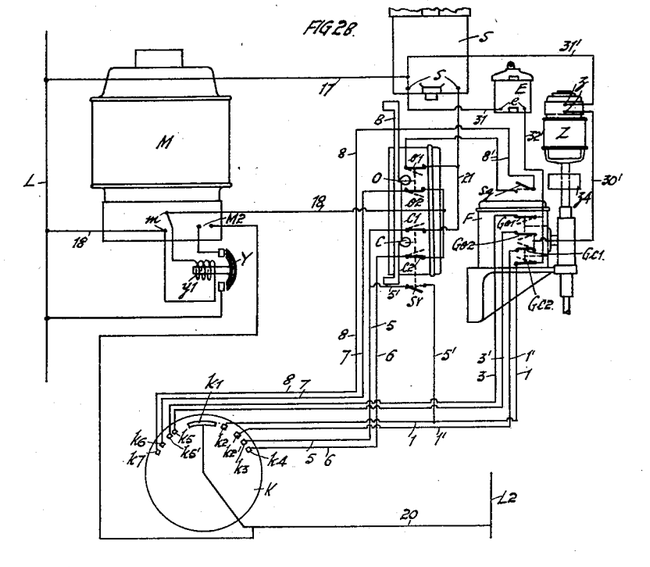

Where, when the by-pass valve is fitted with its independent motor and auxiliary solenoid, it is desired to open and close the by-pass and main valve in the desired sequence, sequence switches $Sg$ and $Sv$ are fitted, their action in ensuring the desired sequence being similar to that described in connection with Fig. 1B. The connections for this arrangement are shown in Fig. 2B, in which corresponding parts are similarly lettered to Fig. 1B, so that the circuit as completed for the various positions of the controller may be readily followed.

The by-pass valve is opened as described in connection with Fig. 2A. When it is desired to open both valves the controller is moved so that segment $k1$ contacts with $k5$, $k6$ and $k7$. The closing of the by-pass valve (assuming it to be open) before the main valve is closed being ensured by reason of the sequence switch $Sg$ in the circuit of the main solenoid, being open until the by-pass open limit switch is closed and the by-pass valve therefore opened.

Similarly when closing the main and by-pass valve in the desired sequence the segment $k1$ is made to contact with the contacts $k2'$, $k3$ and $k4$ the circuit of the main motor and main solenoid are made and the main valve closed. The circuit of the auxiliary solenoid E and the auxiliary motor Z are not made until the main valve is closed, whereupon its "close" limit switch is open and the sequence switch $Sv$ is closed and the by-pass valve is then closed, whereupon its closed limit switch opens and disconnects the auxiliary solenoid and auxiliary motor from the main.

The modified arrangement of the sequence valves described in connection with Fig. 10 may be applied to the arrangement in which the by-pass valve is operated by an auxiliary motor. Connections for this arrangement being shown in Fig. 2C. The action is substantially similar to that described in connection with Fig. 1C.

Figure 2C:
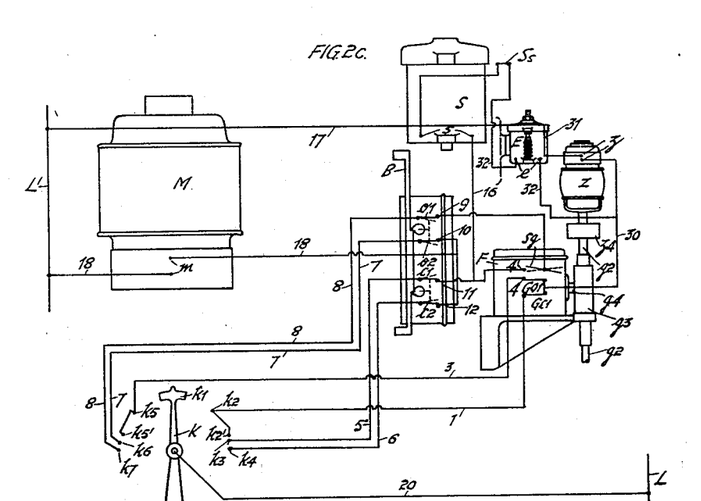

The sequence switch $Sg$ ensures that in the opening position the main valve shall not open until the by-pass valve has been opened, and the sequence valve $Ss$ ensuring in the closing position that the auxiliary solenoid E, and motor Z are not energized to close the by-pass valve until the main valve has been closed, its close limit switch opened and the main solenoid S de-energized.

Figures 3, 4:
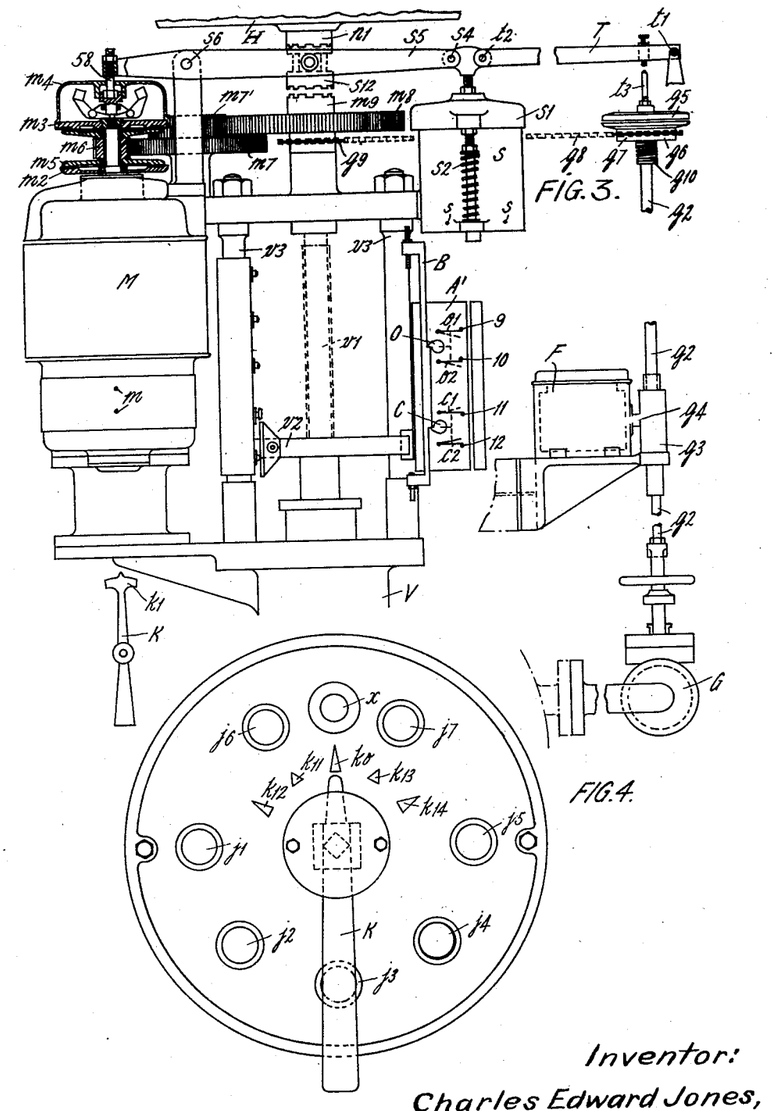
Fig. 3 is a view similar to Fig. 1 but illustrates an arrangement in which the clutch gear for the by-pass valve is operated by the main solenoid.
Fig. 4 is a face view of a suitable form of controller.
Figure 3A:
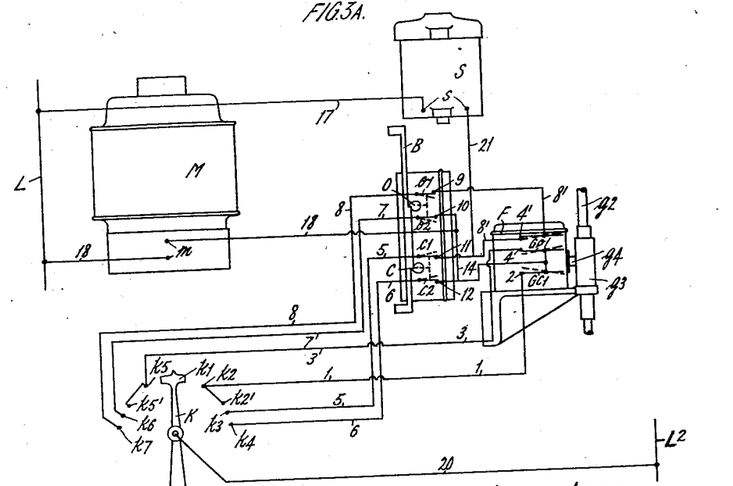
Fig. 3A is a view showing the electrical connections for Fig. 3 and is a view similar to Figs. 1C and 2C and shows the mode in which the sequence switch is applied to the arrangement of Fig. 3.

I have shown in Figs. 3 and 3A the mode in which the sequence valve $Sg$ may be employed positively to ensure the correct opening sequence of main and by-pass valves when the two valves are operated by the one motor M, and when the clutch $g5$, $g6$ is controlled by the main solenoid S, the arrangement comprising a lever T (see Fig. 3) fulcrumed at one end $t1$ and connected at the other end $t2$ to the moving part $s1$ of the solenoid S, the lever being connected by a rod $t3$ to an axially movable part of the clutch $g5$, $g6$ so that these parts are engaged by a spiral spring $g10$ when the solenoid S is deenergized but are disconnected by the movement of the lever T when the solenoid S is energized.

The electrical connections are shown in Fig. 3A, the contacts $k2$ and $k5$ are connected by the leads 1 and 3 to the respective close and open limit switches of the by-pass valve, and these switches are connected through leads 21, 14 and 18 through the motor M to the supply main L as described. The by-pass valve is opened or closed by moving the segment $k1$ to the contacts $k5$ or $k2$ as the case may be; to open both main and by-pass valves in desired sequence, $k1$ is made to contact with $k5'$ (connected to $k5$) and contacts $k6$ and $k7$, $k6$ energizing the motor through the limit switch $o2$, and $k5'$ energizing the motor through by-pass limit switch $Go1$, these contacts start up the main motor M, but do not at first energize the main solenoid S since the open sequence switch $Sg$ is in the circuit $k7$, lead 8, switch $o1$, lead $8^1$, switch $Sg$, lead 21, solenoid S and lead 17, to the main L; the by-pass valve therefore opens, whereupon the limit switch $Go1$, breaks the motor circuit through lead 21; the sequence switch $Sg$ then closes, whereupon the solenoid S is energized and the main valve open.

When segment $k1$ is moved to contact with contacts $k2'$ (connected to $k2$) and contacts $k3$ and $k4$, connections are made which ensure first, the closing of the main valve through circuits closed by the limit switches $c1$ and $c2$; when the main valve is closed these limit switches open leaving the motor circuit connected through the limit switch $Go1$, the solenoid S being then deenergized, the clutch $g5$, $g6$ is engaged (see Fig. 3) and the by-pass valve closed; when the by-pass valve is closed switch $Go1$ opens and disconnects the motor from the supply.

Fig. 4 is a face view of a suitable arrangement of the controller K; $k10$ is its "mid" or "off" position; $k11$ by-pass open position; $k12$ by-pass and main valve open position; $k13$ by-pass close position; and $k14$ by-pass and main valve close position.

Signal lamps $j1$, $j2$, $j3$, $j4$, $j5$ connected in series respectively, with switches J (see Fig. 1) and a suitable source of potential, indicate the extent to which the main valve is open, $j1$ and $j5$ respectively indicate valve fully open, and valve completely closed, $j2$, $j3$ and $j4$ indicate the fractional part by which the valve is open, $j6$ and $j7$ are similar lamps connected in series with corresponding contacts on the by-pass valve and indicate whether the by-pass valve is open or closed; $x$ is a switch employed to control the signal lamps.

Figure 5:
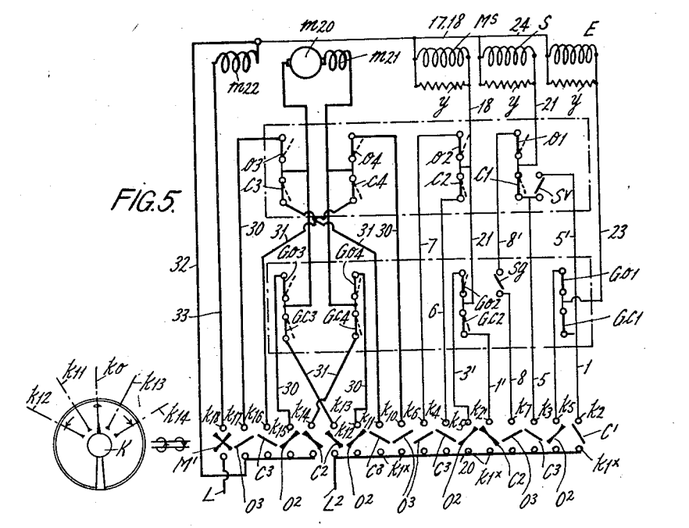
Fig. 5 is a diagram of a suitable controller and connections for the arrangement of Fig. 1D when the motor is of direct current type.
Figure 6:
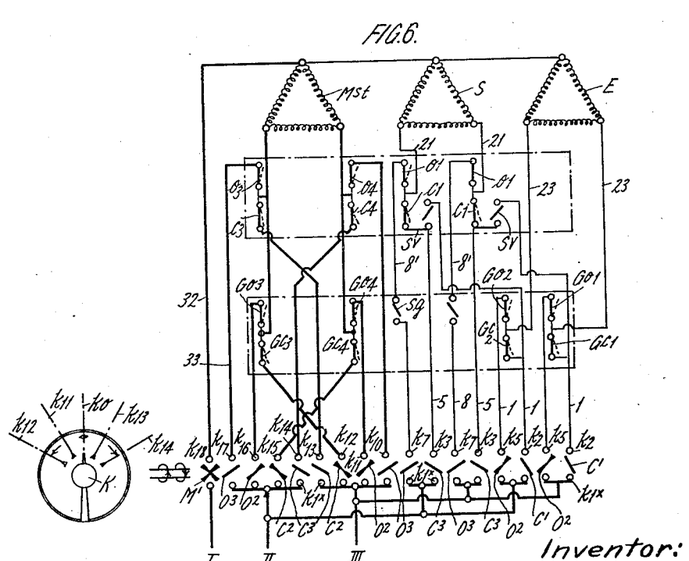
Fig. 6 is a similar diagram showing the arrangement when the motor is of the three-phase alternating current type.

Fig. 6 is a diagram of the connections described and includes also the motor armature connections, this diagram is intended to show how the connections are arranged when a drum controller is employed to make the connections described in reference to Fig. 1B. The contacts $k2$ to $k7$ of Fig. 1B are similarly lettered in Fig. 5; L and L2 are the supply mains and the lead 20 is the equivalent to the lead 20 in Fig. 1B and connects a series of contacts $k1^x$ to the main L2. A series of segmental contacts are coaxially mounted on the drum connecting fixed contacts suitably arranged; for clearness of description the contacts are shown conventionally as though they were on separate parallel axes.

A segment $C'$ bridges its contacts when the controller is moved to its by-pass close position, and segments C2 bridge their contacts when the controller is moved to the by-pass close position and also close their contacts when the controller is moved over to its by-pass and main valve close position; segments C3 bridge their contacts when the controller is moved to the by-pass and main valve close position; segments O2 bridge their contacts when the controller is moved to by-pass valve open position, and also when the controller is moved to by-pass and main valve open position. Segments O3 bridge their contacts when the controller is moved to the by-pass and main valve open position; segments $M'$ bridge their contacts in all positions of the controller except the "off" position.

$o1$ and $o2$ are the main valve open limit switches, $c1$ and $c2$ are main valve close limit switches; $Go1$ and $Go2$ are by-pass open limit switches and $Gc1$ and $Gc2$ are by-pass close limit switches; and $Sg$ and $Sv$ are sequence switches; these are the switches shown in Fig. 1B. Additional limit switches $o3$, $o4$, $c3$, $c4$, $Go3$, $Go4$, and $Gc3$, $Gc4$ are fitted in corresponding positions in the motor armature and interpole circuit $m20$, $m21$; and pairs of armature connections 30, and cross-over or reverse connections 31 are connected to the contacts $k10$ to $k17$. The motor series coil $m22$ has one end connected by the lead 32 to respective contacts opposite to contacts $k14$ to $k17$, and its other end is connected by the lead 33 to contact $k18$, which is bridged across by the segments $m1$ to a corresponding contact on the supply main L.

E is the auxiliary solenoid, S the main solenoid, and $Ms$ the motor shunt winding; and $y$ are safety or spark preventing resistances.

The connections are as far as possible numbered and lettered to correspond with Fig.

1B, and it will be seen that when the controller is moved clockwise to its first close position the segments C' and C2 bridged their contacts and make the connections made when the segment k1 of Fig. 1B is moved to its by-pass close position contacting with k2 and k2'. In this position the necessary connections are made to cause the motor armature to rotate and close the by-pass valve. Further movement in a clockwise direction to the by-pass and main valve close position causes the segments C2, C3, to bridge their contacts and effect the connections made when the segment k1 of Fig. 1B is moved to contact with the contacts k2', k3' and k4; in this position the main and by-pass valves are closed in proper sequence; the motor armature necessary connections being also shown in this diagram.

Similar movement of the controller in a counter-clockwise direction to its first open position causes the segments O2 to connect their respective contacts to make the connections made when the segment k1 (Fig. 1B) connects the contacts k5 and k5', and in this case it will be seen from Fig. 5 that the armature connections of the motor are reversed so as to give the opening movement of the by-pass valve.

If the controller be moved further in a counter-clockwise direction the segments O2 and O3 will make the contacts made when k1 of Fig. 1B is similarly moved, and in this position the by-pass and main valves will be opened in proper sequence.

It will be seen that the additional limit switches shown, ensure the opening of the armature circuit, as well as the other circuits when the corresponding limit switches operate.

Fig. 6 shows an arrangement similar to and arranged in the same diagrammatic manner as Fig. 5. The motor M is an alternating current motor, M$st$ being the stator winding. I, II, III are the three phases of the alternating current supply. The diagram is lettered to correspond, as far as possible, with Fig. 5, so that the action may be readily followed with the description given in connection with Fig. 5.

In this arrangement it is assumed that the motor is a cage induction motor; there is but the one motor circuit, the stator circuit, controlled by the contacts k10 to k18, the stator phase connections being changed-over, as shown, when reversal of rotation of the motor is required.

The contacts k2, k5', k4 and k6, which in Fig. 5 were used to complete the motor shunt connections are not needed in the arrangement of Fig. 6. Each of the contacts k2, k3, k5 and k7 are duplicated so as to connect the solenoids E and S in delta across the three phases, the connection to phase I being permanently made.

It will be noted, in each of the constructions herein described, if the controller be moved to a valve "close" position, and the corresponding by-pass valve, or main valve, or both be thereby closed, that the said valve or valves cannot effectively be opened by the hand-gear H, since as soon as the valve begins to open the "close" limit switches close and completes through the controller the circuits necessary to ensure the closing of the valve. In similar manner when the controller is moved to a valve "open" position and the valve opened it cannot be closed by the hand-gear.

In the example illustrated I have shown the limit, sequence and reversing switches actually in the motor and solenoid circuits which they control; it is however, usual when comparatively large currents have to be dealt with to use contactors actuated by closing coils or the like, and the switches referred to would then obviously be placed, in the circuits of the said closing coils which are, of course, in the matter of control the equivalents of the circuits controlled by the contactors.

For instance in Fig. 2B the contacts $m$, $m$, may be regarded as the terminals of the closing coil $y1$ of a contactor Y, adapted when closed to energize the motor circuit M2. Such contactors would, in a manner well known to those skilled in the art be used mainly in the motor armature circuits, (where heavy currents have to be dealt with) to effect the reversals.

Figure 7:
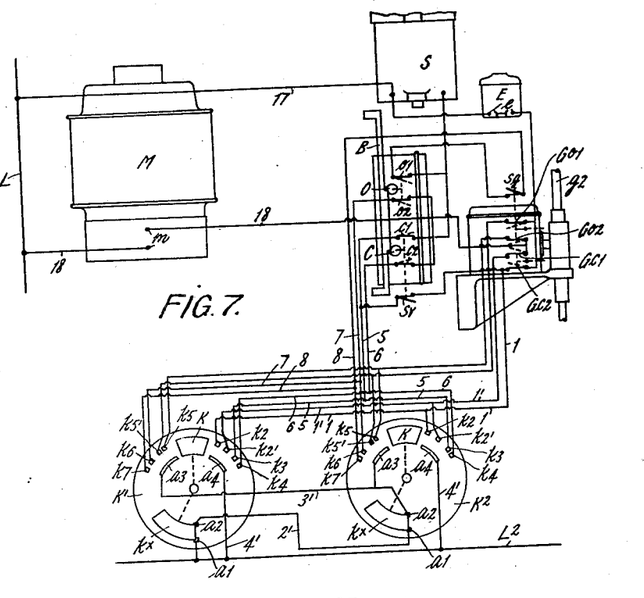
Fig. 7 shows an interlocking arrangement for two controllers.

Fig. 7 shows the valve operating apparatus of Fig. 1B fitted with two controllers K1 and K2 adapted to be located in different positions, and interlocked by interconnections in such manner that when the moving part of either of them is moved to a valve closing position, the valve is closed and the other controller rendered inoperative to open it.

Each controller has closing contacts k2, k2', k3 and k4 and opening contacts k5, k5', k6 and k7, and these sets of contacts are connected to the limit and sequence switches as described in connection with Fig. 1B, the contactors 1, 1', 3, 3', 5, 6, 7 and 8 being common to the respective controllers; $k$ and $k^x$ are contact plates and a pair $k$ and $k^x$ constitute the movable part of each controller; in each controller the contact plate $k$ connects the required group of closing contacts k2, k2', k3 and k4 to a contact plate a4 connected to the main L2, and connects the opening contacts k5, k5', k6 and k7 to a contact plate a3 connected to the main L2 in series with two pairs of safety contacts a1, a2, one pair located in each controller. The contact plate $k^x$ in each controller connects the safety contacts a1 and a2 in the controller when the moving part of the controller is either in mid position or in a valve-opening position; these contacts a1 and a2 in a controller are however, disconnected when the moving part of the controller is in a valve-closing position. It will therefore be seen that each controller is made predominant in a valve-closing position; that is to say, if a controller moving part be turned to a valve-closing position, then, whatever may be the position of the valve, or the other controller, the appropriate valve or valves is closed and cannot be opened by operation of the other controller, nor can such valve or valves be opened by movement of the manual operated gear, since the slightest movement of the latter gear causes the corresponding limit switches to close whereupon the valve or valves are closed by the electrically, operated means.

Having now fully described my invention, I declare that what I claim and desire to secure by Letters Patent is:—

1. The improvement in electrically operated valves and by-pass valves therefor, in which, reversible electrical driving means for operating the valves are adapted to be connected to the main valve by a main clutch controlled by a main solenoid, and to be connected to the by-pass valve by an auxiliary clutch controlled by an auxiliary solenoid, and in which a controller switch is adapted, when a valve has to be operated, to make electric contacts which connect the electric driving means to a source of potential so that said means operate the valve in the appropriate direction, said controller, when the main valve has to be operated also making contacts which connect the main solenoid to a source of potential, and when the by-pass valve has to be operated also making contacts which connect the auxiliary solenoid to the source of potential.

2. The improvement in electrically operated valves and by-pass valves therefor, in which, reversible electrical driving means for operating the valves, and manually operated means therefor are adapted alternatively to be connected by a main clutch to the main valve, and in which the said electric driving means are adapted to be connected to the by-pass valve by an auxiliary clutch; the said main clutch being controlled by a main solenoid, and the auxiliary clutch being controlled by an auxiliary solenoid; and in which a controller switch is adapted, when a valve has to be operated to make contacts which connect the driving means to a source of potential so that they operate the valve in the appropriate direction, said controller, when the main valve has to be operated, also making contacts which connect the main solenoid to the source of potential, and when the by-pass valve has to be operated making contacts which connect the auxiliary solenoid to the source of potential.

3. In valve operating apparatus, in combination;—a main valve; "open" and "close" limit switches operated by the main valve; a by-pass valve for the main valve; "open" and "close" limit switches operated by the by-pass valve; electrical driving means for operating the respective valves; switches for reversing the direction of rotation of the said means; a main clutch to connect the electrical driving means to the main valve; a main solenoid to control the main clutch; an auxiliary clutch to connect the electrical driving means to the by-pass valve; an auxiliary solenoid to control the auxiliary clutch; a source of electrical potential; and a controller adapted in each of its valve-closing positions to make contacts which connect the electrical driving means through the reversing switch and corresponding "close" limit switches to the source of potential so that the said means rotate in the one direction, and in each of its valve opening positions to connect the electrical driving means through the reversing switch and corresponding "open" limit switches to the source of potential so that the said direction of rotation is reversed, said controller in a by-pass valve operating position making contacts which connect the auxiliary solenoid to the source of potential through a by-pass limit switch, and in each main valve operating position making contacts which connect the main solenoid to the source of potential through a corresponding main valve limit switch.

4. In valve operating apparatus, in combination;—a main valve; "open" and "close" limit switches operated thereby; a by-pass valve for the main valve; "open" and "close" limit switches operated by the by-pass valve; a sequence switch operated by the by-pass valve and closed when the latter is open; electrical driving means for operating the respective valves; switches for reversing the direction of rotation of the said means; a main clutch to connect the electrical driving means to the main valve; a main solenoid to control the said main clutch; an auxiliary clutch to connect the electrical driving means to the by-pass valve; an auxiliary solenoid to control the said auxiliary clutch; a source of electrical potential; and a controller adapted in each of its valve-closing positions to connect the said electrical driving means, the reversing switch and corresponding "close" limit switches across the source of potential, the reversing switch being differently connected for opening and closing movements respectively; said controller also in its by-pass valve operating position connecting the auxiliary solenoid through the appropriate by-pass limit switch to the source of potential, and said controller in its main valve operating positions connecting the main solenoid through the appropriate main valve limit switch to the source of potential, the by-pass sequence switch being included in the main valve opening position in the said main solenoid circuit.

5. In valve operating apparatus, in combination;—a main valve; "open" and "close" limit switches operated by the main valve; a sequence switch operated by the main valve and closed when the main valve is closed; a by-pass valve for the main valve; "open" and "close" limit switches operated by the by-pass valve; a sequence switch operated by the by-pass valve and closed when the by-pass valve is open; electrical driving means for operating the respective valves; switches for reversing the direction of rotation of the said means; a main clutch to connect the electrical driving means to the main valve; a main solenoid to control the said main clutch; an auxiliary clutch to connect the electrical driving means to the by-pass valve; an auxiliary solenoid to control the auxiliary clutch; a controller having a first and second valve-opening position, a mid-off position, and a first and second valve-closing position, and adapted in its first valve-opening position, and its first valve-closing position to connect the electrical driving means and reversing switch through a by-pass valve limit switch to the source of potential, and to connect the auxiliary solenoid through a by-pass limit switch to the source of potential, and being adapted in its second valve-opening position to connect electrical driving means and reversing switch through corresponding "open" limit switches to the source of potential, to connect the main solenoid through a main valve open limit switch and by-pass valve sequence switch to the source of potential; and to connect the auxiliary solenoid through a by-pass "open" limit switch to the source of potential, said controller in its second valve-closing position being adapted to connect the electrical driving means, and reversing switch through "close" limit switches to the source of potential, to connect the main solenoid through a main valve "close" limit switch to the source of potential, and to connect the auxiliary solenoid through a by-pass "close" limit switch and main valve sequence switch to the source of potential.

6. The modification of the apparatus claimed in claim 5, according to which the sequence switch connected in the circuit of the auxiliary solenoid, in the second valve closing position, is operated by the main solenoid instead of by the main valve.

7. Apparatus as claimed in claim 1, in which the electric driving means is a single motor connected to the main valve by a clutch operated by the main solenoid and connected to the by-pass valve by an auxiliary clutch operated by the auxiliary solenoid.

8. In apparatus as claimed in claim 4, in which the electric driving means is a single motor connected to the main valve by a clutch operated by the main solenoid and connected to the by-pass valve by an auxiliary clutch operated by the auxiliary solenoid.

9. Apparatus as claimed in claim 5, in which the electric driving means is a single motor connected to the main valve by a clutch operated by the main solenoid and connected to the by-pass valve by an auxiliary clutch operated by the auxiliary solenoid.

10. Apparatus as claimed in claim 1, in which the main valve is adapted to be connected by a main clutch alternatively to an electric motor and to manual means for operating the valve, said main clutch being controlled by a main solenoid, and in which said electric motor is adapted to be connected to the by-pass valve by an auxiliary clutch operated by an auxiliary solenoid.

11. In apparatus as claimed in claim 1 in which the electrical driving means comprise a main motor adapted to be coupled to the main valve by a clutch controlled by the main solenoid, and an auxiliary motor adapted to be coupled to the by-pass valve through an auxiliary clutch controlled by the auxiliary solenoid.

12. In apparatus as claimed in claim 4, in which the electrical driving means comprise a main motor adapted to be coupled to the main valve by a clutch controlled by the main solenoid, and an auxiliary motor adopted to be coupled to the by-pass valve through an auxiliary clutch controlled by the auxiliary solenoid.

13. In apparatus as claimed in claim 5, in which the electrical driving means comprise a main motor adapted to be coupled to the main valve by a clutch controlled by the main solenoid, and an auxiliary motor adapted to be coupled to the by-pass valve through a clutch controlled by the auxiliary solenoid.

14. In apparatus as claimed in claim 1, in which the main valve is adapted to be coupled alternatively to manually operated means and a main motor by a main clutch controlled by the main solenoid, and in which an auxiliary motor is adapted to be coupled to the by-pass valve through a clutch controlled by the auxiliary solenoid.

15. The combination of the apparatus claimed in claim 5, of electrically operated contactor switches to make the main circuits of the closing coils of the contactors being connected in the circuits closed by the controller.

16. Apparatus as claimed in claim 1, in which the apparatus is fitted with two controllers each adapted to make contacts to operate the valves and each fitted with a pair of safety contacts which are closed only when the controller to which they are fitted is in the "off" position or any valve opening position; each valve opening circuit made by either of the controllers being completed through the safety contacts of the other controller, so that when either controller is moved to a valve closing position the corresponding valve is closed, and the other controller rendered inoperative to open the valve.

17. Apparatus as claimed in claim 5, in which the apparatus is fitted with two controllers adapted to make the contacts described and each fitted with a pair of safety contacts which are closed only when the controller to which they are fitted, is in the "off" position or any valve opening position; each valve opening circuit made by either of the controllers being completed through the safety contacts of the other controller, so that when either controller is moved to a valve closing position the corresponding valve is closed and the other controller rendered inoperative to open the valve.

18. Apparatus as claimed in claim 5, in which the electrical driving means comprise a direct current electric motor, and in which the controller is a five position drum controller provided with pairs of fixed contacts and corresponding segmental contacts carried by the drum adapted to complete in the first and second opening positions and the first and second closing positions respectively, the respective circuits described in the said claim.

19. Apparatus as claimed in claim 5, in which the electrical driving means comprise an alternating current electric motor, and in which the controller is a five position drum controller provided with pairs of fixed contacts and corresponding segmental contacts carried by the drum adapted to complete in the first and second opening positions and the first and second closing positions respectively, the respective circuits described in the said claim.

20. The combination with the apparatus claimed in claim 3, of manual means for operating the main valve, and of a centrifugally operated friction clutch connected between the electric driving means and the main clutch, and operated by the main solenoid.

21. Apparatus as claimed in claim 3, in which the electrical driving means comprise a main electric motor adapted to be connected to the main valve through a main clutch operated by the main solenoid, and an auxiliary electric motor adapted to be coupled to the by-pass valve through an auxiliary clutch controlled by the auxiliary solenoid, the combination of a centrifugally operated friction clutch interposed between the main motor and the main clutch, and a centrifugally operated friction clutch interposed between the auxiliary motor and the auxiliary clutch.

22. In electrically actuated valve operating apparatus, in combination;—a main valve; "open" and "close" limit switches operated by the main valve; a by-pass valve for the main valve; "open" and "close" limit switches operated by the by-pass valve; a sequence switch operated by the by-pass valve so as to close when the latter is full open; electrical driving means for operating the respective valves; switches for reversing the direction of rotation of the said means; a main clutch for connecting the electrical driving means to the main valve; an auxiliary clutch to connect the electrical driving means to the by-pass valve; a solenoid to control the said clutches so that when the said solenoid couples one of the clutches it uncouples the other; a source of electrical potential; a controller having first and second valve-opening positions, a mid-off position, and first and second valve-closing positions, and adapted, in the first opening position to make contacts adapted to connect to the source of potential a circuit including a by-pass valve "open" limit switch, the electrical driving means, and the reversing switches, whereby the said means open the by-pass valve; and in the second opening position to close contacts which connect to the source of potential the following circuits;—a circuit through a main valve "open" limit switch including the driving and reversing means, a circuit through the by-pass valve "open" limit switch, including the driving and reversing means, and a circuit through the main valve "open" limit switch, the by-pass valve sequence switch and the solenoid; said controller in the second valve closing position, making contacts to complete circuits corresponding with those of the second valve-opening position but through close limit switches, with driving means connection, and without the sequence switch in the solenoid circuit.

CHARLES EDWARD JONES.